Figure 1:
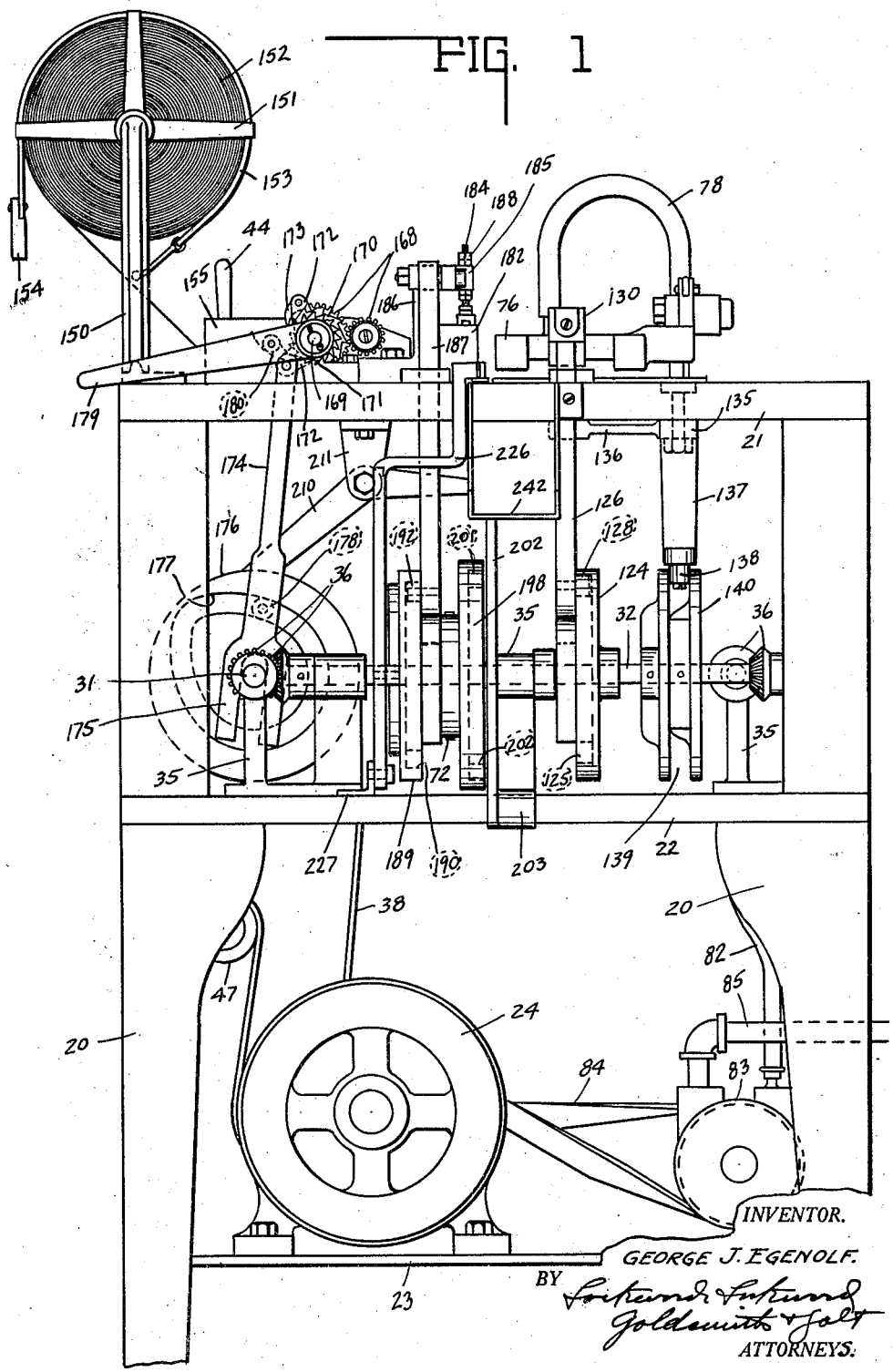

Jan. 6, 1931.  G. J. EGENOLF  1,787,817
FOLDING AND WRAPPING MACHINE
Filed April 20, 1929    8 Sheets-Sheet 1

INVENTOR.
GEORGE J. EGENOLF.
BY
ATTORNEYS.

Jan. 6, 1931. G. J. EGENOLF 1,787,817
FOLDING AND WRAPPING MACHINE
Filed April 20, 1929 8 Sheets-Sheet 3

INVENTOR.
GEORGE J. EGENOLF.
BY
ATTORNEYS

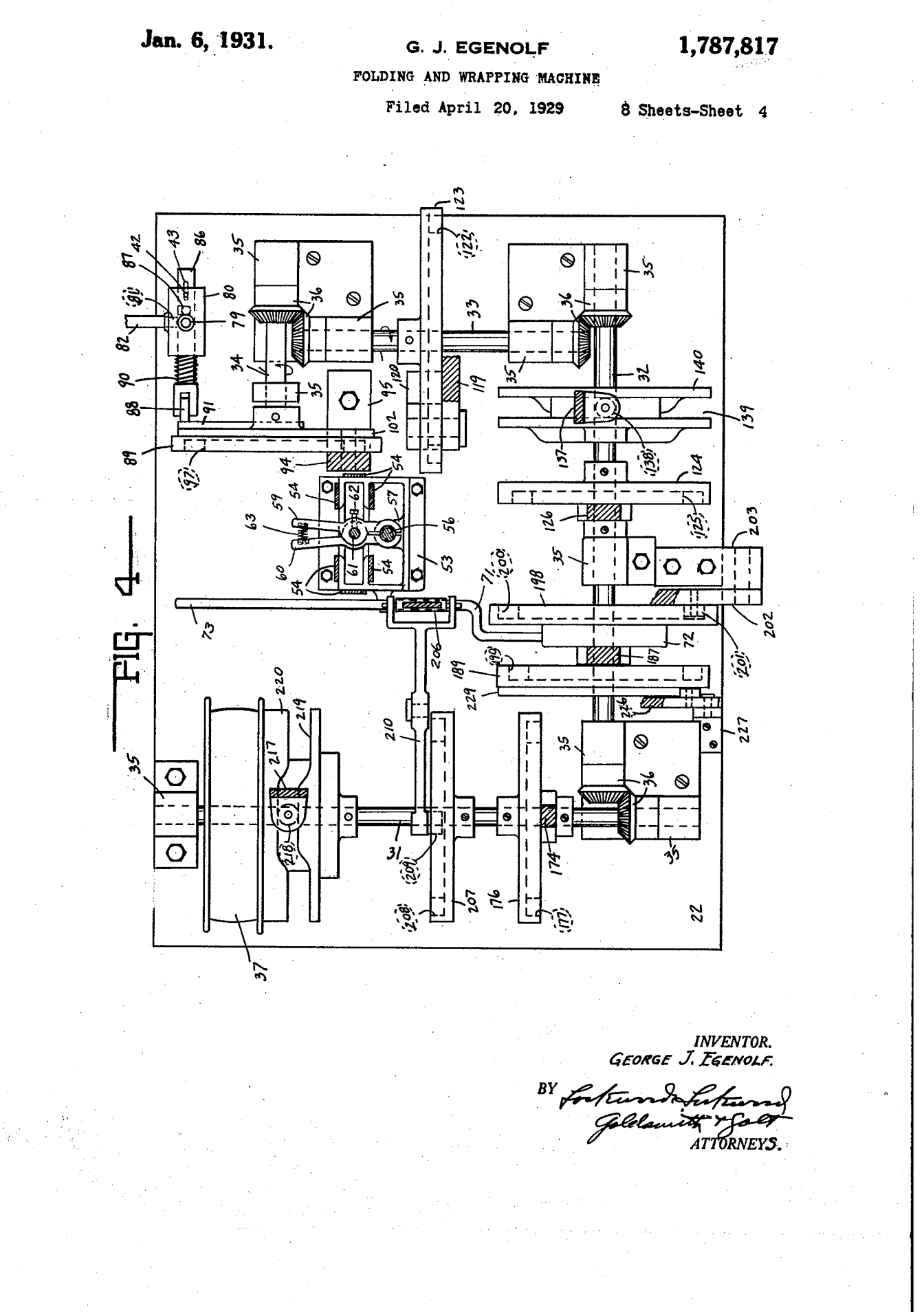

Jan. 6, 1931. G. J. EGENOLF 1,787,817
FOLDING AND WRAPPING MACHINE
Filed April 20, 1929 8 Sheets-Sheet 4

FIG. 4

INVENTOR.
GEORGE J. EGENOLF.
BY
ATTORNEYS.

Jan. 6, 1931. G. J. EGENOLF 1,787,817
FOLDING AND WRAPPING MACHINE
Filed April 20, 1929 8 Sheets-Sheet 5
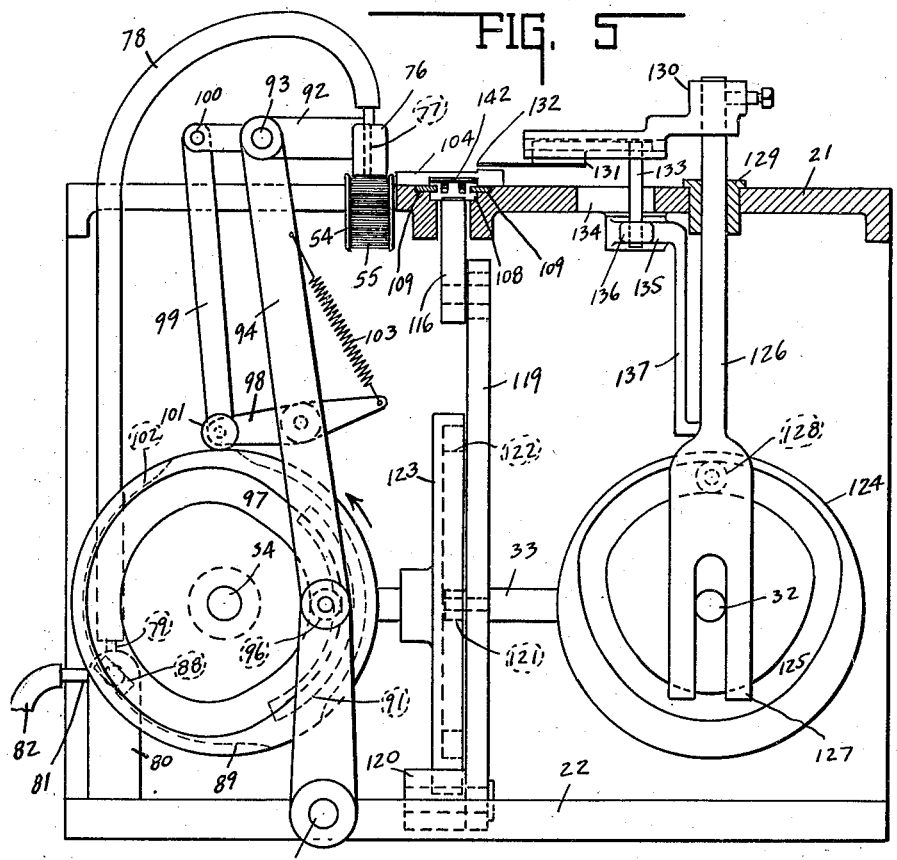
INVENTOR.
GEORGE J. EGENOLF.
BY
ATTORNEYS.

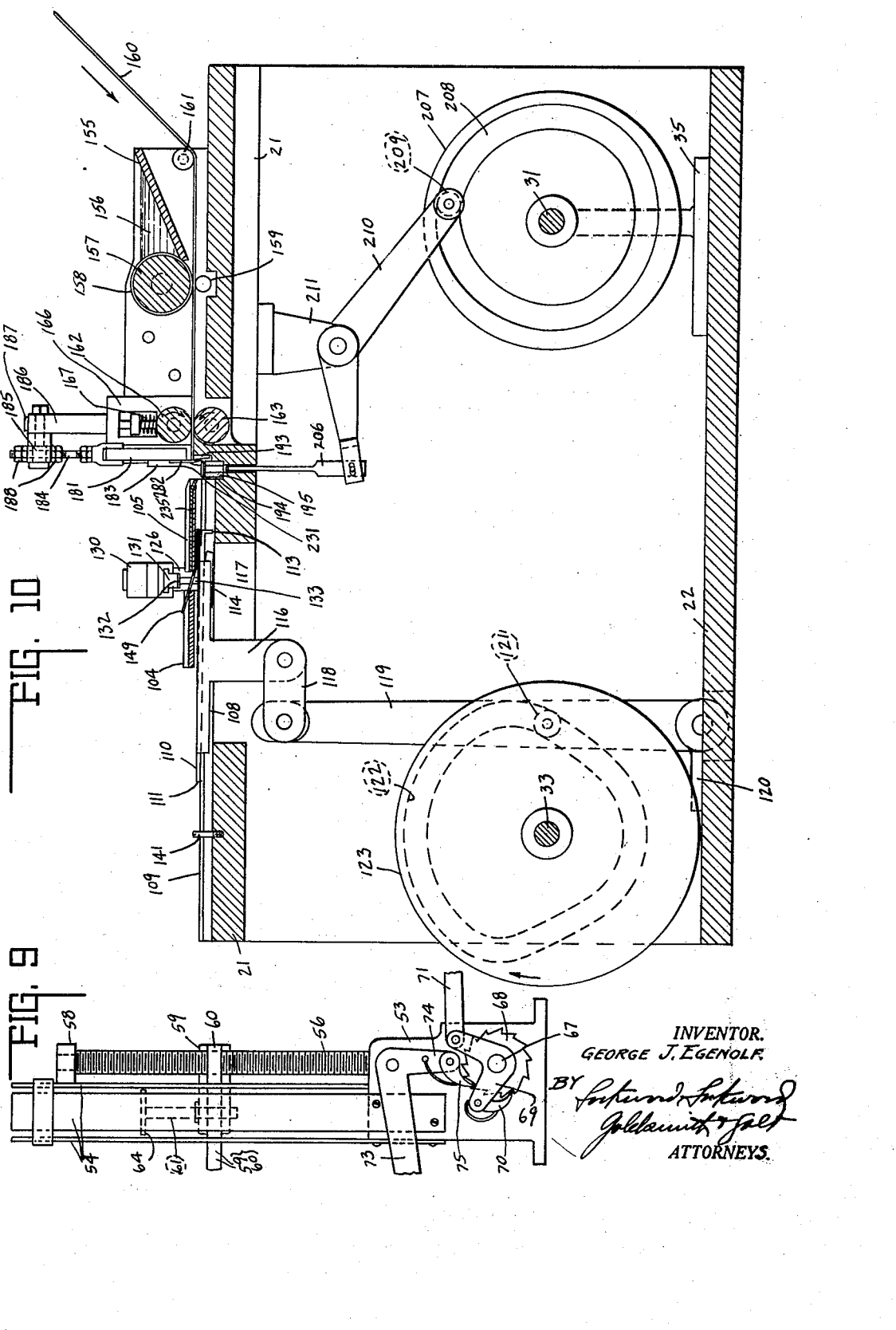

Jan. 6, 1931.  G. J. EGENOLF  1,787,817
FOLDING AND WRAPPING MACHINE
Filed April 20, 1929  8 Sheets-Sheet 7
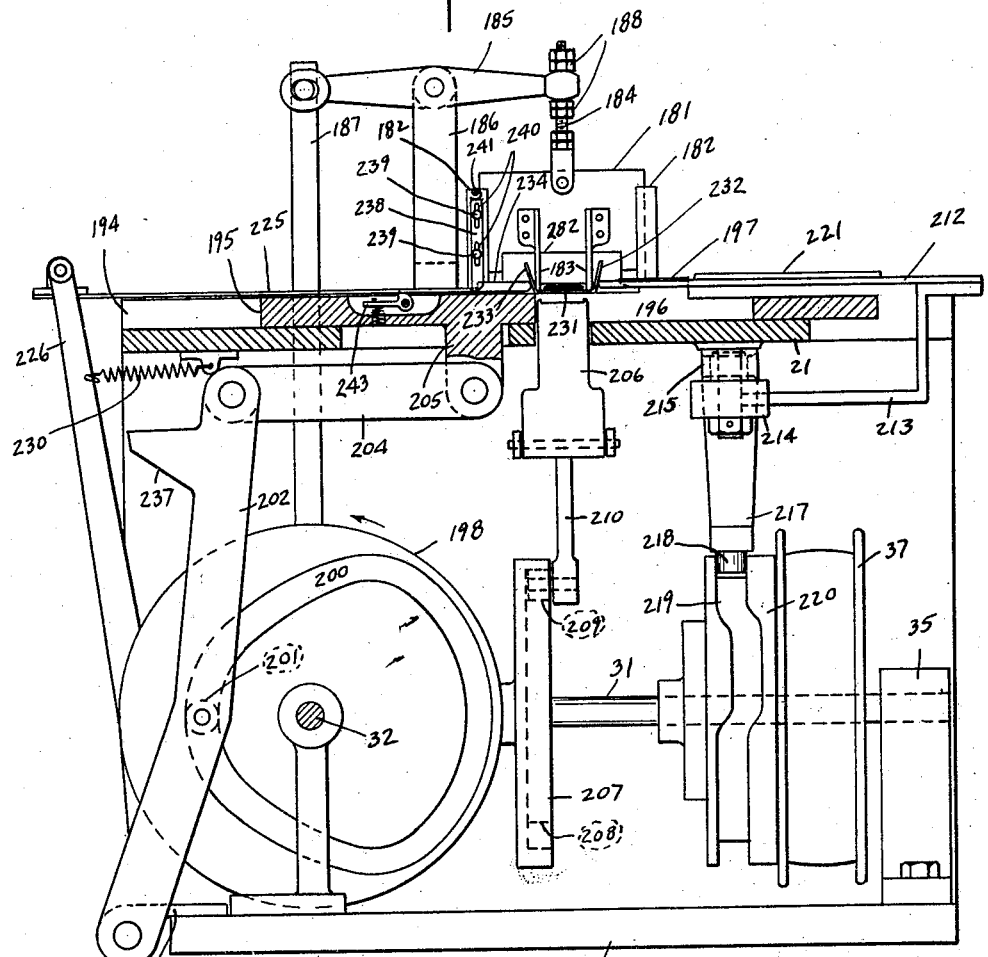
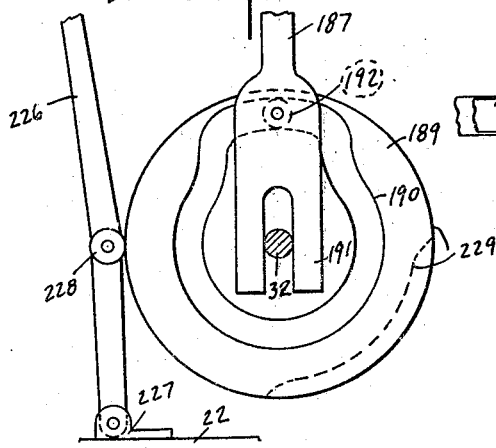
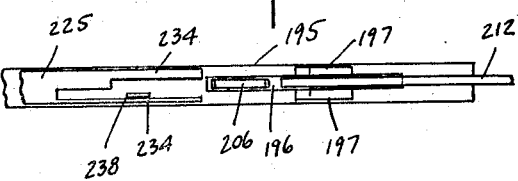
INVENTOR.
GEORGE J. EGENOLF.
BY
ATTORNEYS.

Jan. 6, 1931.                G. J. EGENOLF                1,787,817
                    FOLDING AND WRAPPING MACHINE
                    Filed April 20, 1929    8 Sheets-Sheet 8

INVENTOR.
GEORGE J. EGENOLF.
BY
Lockwood Lockwood Goldsmith & Galt.
ATTORNEYS.

Patented Jan. 6, 1931

1,787,817

UNITED STATES PATENT OFFICE

GEORGE J. EGENOLF, OF INDIANAPOLIS, INDIANA, ASSIGNOR TO THE J. L. MacDANIEL PRINTING COMPANY, INC., OF INDIANAPOLIS, INDIANA, A CORPORATION

FOLDING AND WRAPPING MACHINE

Application filed April 20, 1929. Serial No. 356,684.

This invention relates to a machine for folding articles, such as paper or cloth and sealing the same in a predetermined manner. More particularly it relates to the folding and sealing of strips of paper containing printed information which is to be kept secret until the seal is broken and other printed material which is to be exposed.

In the popular parlor game of "Ask me another," pieces of paper are usually prepared having a question of general interest printed on an exposed portion and the answer thereto printed on a folded portion not exposed to view until an answer has been attempted by one of the players of the game.

The object of the present invention is to supply a machine which automatically folds and seals printed slips of paper containing the questions and answers so that these may be placed on the market at a reasonable cost.

While the above is the specific object of the present invention, it is possible to use the invention for other purposes, as for example, folding and sealing pay roll checks so that the name of the payee is visible and the amount of the check is invisible. The invention may also be used where no visible matter is to be exposed, as for example, folding and sealing circulars for mailing or folding and sealing handkerchiefs or wash cloths for sale. Accordingly, although the following specifications are drawn to a machine for folding small slips of paper, it is to be understood that the invention is not limited to the specific form herein disclosed.

One feature of the invention resides in the novel form of apparatus used to remove the articles to be folded from a storage magazine and place them in position for folding.

Another feature resides in the arrangement of parts whereby a folding member in a single motion doublefolds the article and delivers it in position for sealing.

Another feature of the invention resides in the novel apparatus used to supply the sealing material in timed relation with the folding operation.

Another feature resides in the novel form of sealing mechanism used.

Another feature resides in the novel arrangement of parts wherein all the motions are properly controlled to occur in timed relation to effect the result desired.

Figure 2:
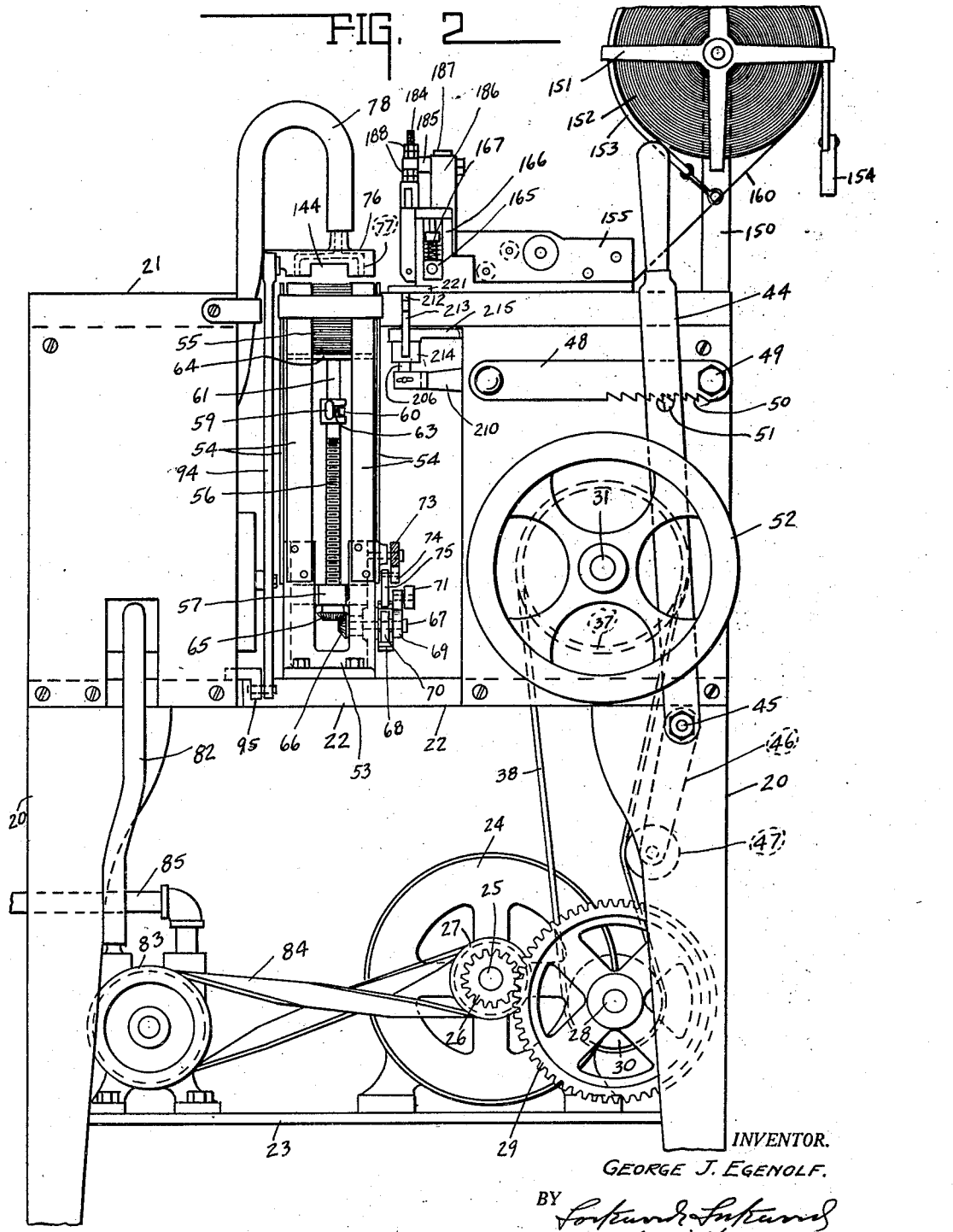
Figure 3:
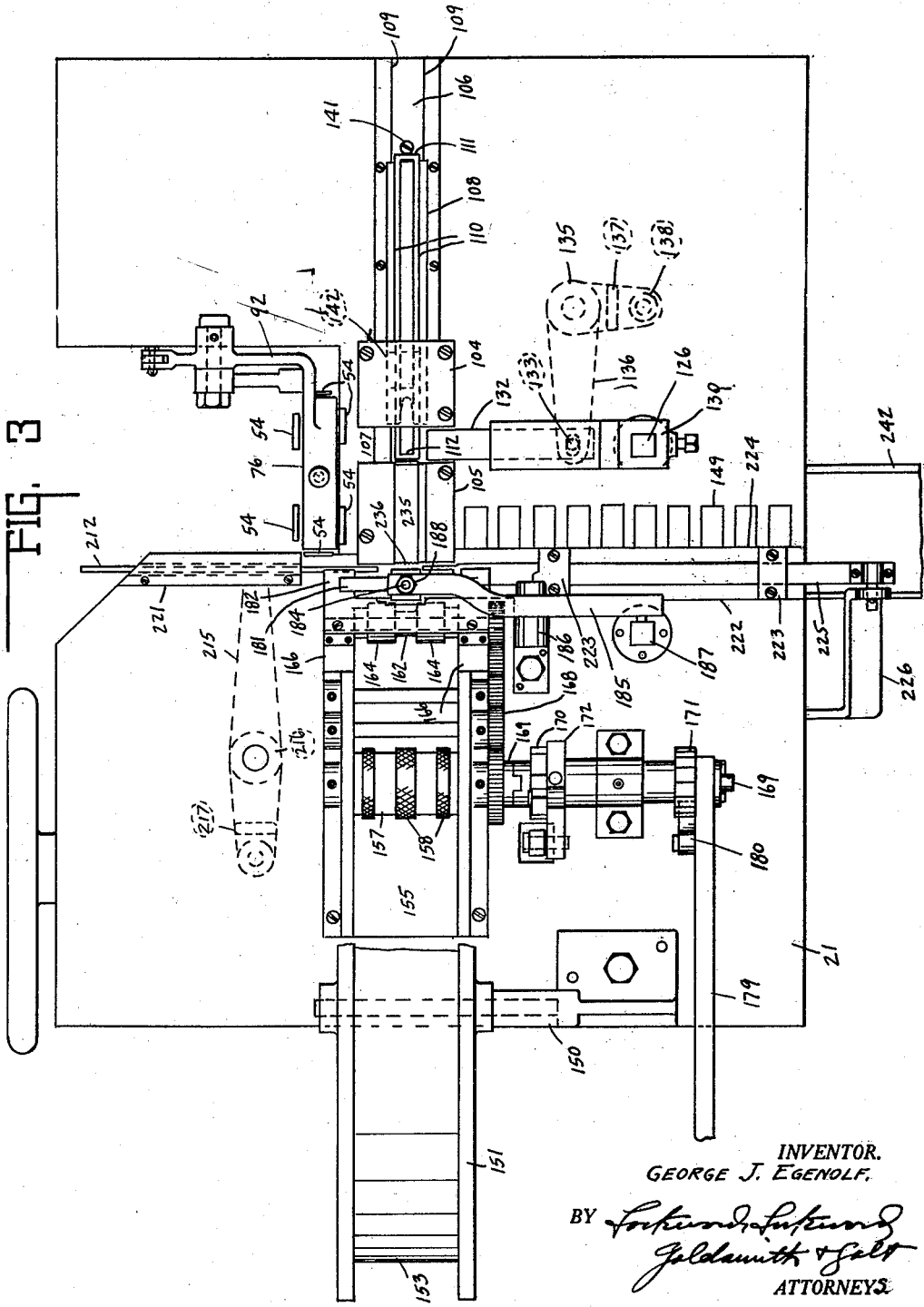

The full nature of the invention and other features thereof will be understood from the accompanying drawings and the following specification and claims:

Fig. 1 is an elevational view of one side of the complete machine. Fig. 2 is an elevational view of the opposite side of the complete machine. Fig. 3 is a plan view of the top of the machine. Fig. 4 is a plan view of the driving shafts and cams used to impart the desired motions to the various parts. Fig. 5 is a sectional view of the mechanism used to remove the papers from the magazine and a part of the folding mechanism. Figs. 6, 7 and 8 are detailed elevational views of the folding mechanism at various positions in the folding operation. Fig. 9 is an elevational view of the storage magazine and associated parts. Fig. 10 is a central section through the folding and cutting mechanisms. Fig. 11 is a central section through the sealing and wrapping mechanism. Fig. 12 is a detailed view of the operating mechanism for one of the wrapping elements. Fig. 13 is a plan view of a part of the mechanism of Fig. 11. Fig. 14 is a perspective view of certain parts of the folding mechanism in disassembled relation. Fig. 15 is a perspective view of the same parts in assembled relation.

Referring to the drawings, a plurality of legs 20 support an upper deck member 21, an intermediate deck member 22 and a lower deck member 23. An electric motor 24 is mounted on the lower deck member 23 and carries on its shaft 25 a pinion 26 and a pulley 27. A second shaft 28 carries spur gear 29 meshing with the pinion 26 and pulley 30.

Mounted on the intermediate deck member 22 are four shafts, 31, 32, 33 and 34 carried on suitable bearings 35. Three pairs of bevel gears 36 constitute a driving connection between the four shafts. A pulley 37 is mounted on shaft 31 and is driven from the pulley 30 by a belt 38. The four shafts 31, 32, 33 and 34 carry a plurality of cams which are used to impart the desired motions to the various parts of the machine, as will be hereinafter described.

A hand lever 44 is fixedly connected to a pin 45 rotatably supported on one of the legs 20. Fastened to the inner end of the pin 45 is a lever arm 46 and rotatably mounted thereon is an idler pulley 47 adapted to engage the belt 38. A lever 48 is pivoted to one of the legs 20 at point 49. A series of notches 50 in the lever 48 engage a tooth 51 carried on the hand lever 44.

To start the operation of the machine after the motor 24 has been started, the hand lever is drawn to the right as represented in Fig. 2, thereby tightening the belt 38. The hand lever is held in the running position by the engagement of the tooth 51 with the notches 50 due to the weight of the lever 48. To stop the machine, the lever 48 is lifted and the hand lever 44 is moved to the left loosening the belt.

A hand wheel 52 on the shaft 31 allows small movements of the machine to be made by hand when the machine is stopped. This is used for adjustments, etc.

*Magazine*

Carried on the intermediate deck 22 there is a magazine consisting of a base casting 53 and a plurality of upright members 54 delineating a rectangular space suitable to receive a pile of the slips of paper 55 which are to be folded and sealed.

A vertical screw shaft 56 is supported on bearings 57 and 58 carried respectively on the casting 53 and one of the vertical members 54. A pair of members 59 and 60 are adapted to clamp about the screw shaft 56 and are threaded to travel longitudinally of the shaft when the cam is rotated. A stem 61 passes through both of said members and is fastened to member 59 by means of set screw 62. A spring 63 is interposed between projecting ends of said members and normally maintains them in clamping relation with respect to the screw shaft 56. A platform 64 is supported by the stem 61 within the magazine and is adapted to carry the pile of papers 55 to be folded. By this construction a rotation of the screw shaft raises or lowers the platform 64 and the pile of papers thereon. By squeezing together the extending ends of the members 59 and 60 against the action of the spring 63 the said members may be disengaged from the screw shaft 56 and the pile of papers raised or lowered by hand.

Mounted on the lower end of the screw shaft 56 is a bevel gear 65 meshing with a bevel gear 66 carried on a pin 67 supported on a bearing in the casting 53. Fixedly carried on the pin 67 is a ratchet wheel 68. A bell crank 69 is rotatably carried on the pin 67 and carries on one arm a spring pawl 70 adapted to engage the ratchet wheel 69. Pivotally attached to the other arm of the bell crank 69 is a rod 71 which is actuated for reciprocal motion by an eccentric 72 carried on the shaft 32. By this construction the rotation of shaft 32 causes the ratchet wheel to be advanced one tooth for each cycle of the machine, thereby rotating the pin 67 and the screw shaft 56 to raise the pile of papers a given distance. The sizes of the teeth of the ratchet wheel are selected to give an amount of lift to the pile of paper sufficient to maintain the top of the pile at a practically constant level as the papers are removed therefrom for folding.

Pivotally mounted on the casting 53 is a hand lever 73 carrying an arm 74 at one end. A second spring pawl 75 is pivotally mounted on the end of the arm 74 to engage the ratchet wheel 68. By the operation of the hand lever the ratchet wheel may be turned by hand through small distances to adjust the pile of papers to the proper height.

*Mechanism for moving papers from magazine to folding station*

Adjacent the upper end of the magazine is a suction block 76 having passageways 77 therein connected to a flexible conduit 78. The conduit 78 is connected to a port 79 of a valve 80 and a second port 81 of said valve is connected by means of a conduit 82 to the intake of a rotary suction pump 83. The pump is driven from the pulley 27 by means of a belt 84 and discharges through a conduit 85 to the atmosphere. By means of this construction the topmost paper in the pile will adhere to the suction block when the said suction block is placed thereon and when the valve 80 is open.

The valve 80 is operated by means of a plunger 86 having port 87 therein adapted to register with the ports 79 and 81 when the plunger is in one position and to be out of registry with said ports when the plunger is in another position. A roller 88 is carried on one end of the plunger 86 and is maintained in contact with the rear surface of a cam 89 by means of a spring 90. The cam 89 is carried on the shaft 34 and rotated thereby. The said surface of the cam has a projecting portion 91 adapted to engage the roller during a part of the rotation of the cam, thereby closing the valve. When the said roller is not in engagement with the projecting portion 91, the valve will be open. A pin 42 carried in the housing of the valve 80 projects into a groove 43 in the plunger 86 thereby preventing rotation of said plunger.

The suction block 76 is carried on the end of a lever 92 which is pivoted at 93 to the top of a substantially vertical lever 94. The lower end of the lever 94 is pivotally mounted in a bearing 95 carried on the intermediate deck member 22. Pivotally mounted on the lever 94 is a roller 96 adapted to be guided in a channelway 97 of irregular shape in the face of the cam 89.

Pivotally carried on the lever 94 is a lever 98, to one end of which is pivotally connected a rod 99, the opposite end of which is pivoted at 100 to an extension of the lever 92 carrying the suction block 76. A roller 101 is pivotally attached at the joint between the lever 98 and rod 99 and rolls upon an irregular surface 102 carried on the cam 89. A spring 103 is attached at one end to an extension of the lever 98 and at the opposite end to the lever 94 and serves to normally maintain the roller 101 in contact with the irregular surface 102.

In the operation of this mechanism the lever 94 is caused to oscillate about its pivot point 95 by the action of the cam 89 upon the roller 96. The oscillation of this lever imparts a substantially horizontal oscillation to the suction block 76. The action of the irregular surface 102 upon the roller 101 acting through the rod 99 and the lever 92 causes substantially vertical reciprocating movements of the suction block 76.

By a combination of these motions with the operation of the valve 80 occurring in proper sequence, the topmost paper is removed from the pile by the suction block and placed on a pair of receiving plates 104 and 105. The paper is held in place on said plates by mechanism to be hereinafter described while the valve 80 is closed and the suction block returned to the top of the pile.

*Folding mechanism*

A groove 106 is cut in the top of upper deck 21 and is partially covered by the receiving plates 104 and 105. The said plates are spaced apart leaving a space 107 therebetween. A reciprocating member 108 is slidably mounted in groove 106 on guide members 109 attached at the edges of said groove to the deck plate 21. A pair of grooves 108a (Fig. 14) in the upper surface of said reciprocating member 108 carry two portions 110 of a second reciprocating member. The two portions 110 are joined together at one end by a cross piece 111 and at the opposite end by a cross piece 112 (see Fig. 3) having a downwardly-projecting portion 113 (see Figs. 6, 7, 8, and 10).

The members 110 are longer than the reciprocating member 108 and are free for longitudinal movement with respect to said member 108. This longitudinal movement is limited by the cross pieces 111 and 112. The retaining slots 108a for members 110 are covered at one end of the member 108 by a plate 142 fastened to the reciprocating member 108 and having a portion 143 projecting beyond the end thereof. A leaf spring 114 is fixed to the underside of the same end of the reciprocating member 108 and carries an upraised portion 115 in contact with the members 110. The depth of the members 110 is less than the depth of their retaining slots 108a and the leaf spring 114 serves to normally maintain said members 110 in the upper portion of said slots in contact with the cover plate 142.

The reciprocating member 108 has a portion 116 extending downwardly through an opening 117 in the upper deck 21. A link 118 is pivotally fastened to said downwardly-extending portion 116 and is pivotally fastened at its opposite end to the upper end of a substantially vertical lever 119. The lever 119 is pivotally mounted at its lower end on a bearing 120 carried on the intermediate deck 22. A roller 121 is mounted on said lever 119 in a position intermediate of its ends and is adapted to be guided in an irregularly-shaped channelway 122 in one face of a cam 123. The cam 123 is mounted upon shaft 33 and is rotated thereby. By this construction the rotation of shaft 33 causes the reciprocation of the member 108.

Mounted on the shaft 32 and rotated thereby is a cam 124 having an irregularly-shaped guideway 125 in one of its faces. A substantially vertical member 126 carries at its lower end a yoke 127 adapted to straddle the shaft 32. A roller 128 is also carried on said member 126 and is adapted to be guided in said irregular channelway 125. The upper end of the member 126 is guided in a bushing 129 carried in the deck plate 21. The rotation of cam 124, therefore, causes vertical reciprocating motion of member 126 controlled by the shape of the irregular channelway 125.

The upper end of the member 126 carries a member 130. A member 131, having a projecting tongue 132, is slidably supported in said member 130. A downwardly-projecting stem 133 is attached to said member 131 and extends through opening 134 in the upper deck member 21. A bell crank 135 is pivotally mounted on the undersurface of the deck plate 21. The stem 133 projects through an opening in one arm 136 of the bell crank 135 and is free for vertical movement with respect to said arm. The other arm of said bell crank has a downwardly-extending portion 137 carrying a roller 138 engaging an irregular channelway 139 in the periphery of a cam 140 mounted on the shaft 32 and rotated thereby. By this construction, the rotation of cam 140 causes a horizontal reciprocating motion of the member 131 with respect to the member 130 which is controlled by the shape of the channelway 139 independently of the vertical movements of the member 130.

In the operation of the folding apparatus, the reciprocating member 108 is moved to the position shown in Figs. 3 and 6. In this position, the cross piece 111 is in contact with a stop 141 carried in the groove 106. The opposite ends of the members 110 are thereby positioned beneath the opening 107 between receiving plates 104 and 105. The end of reciprocating member 108 and the projecting portion 143 of the plate 142 are located beneath the receiving plate 104. The tongue 132 is located in a raised position adjacent the space 107 as best shown in the plan view Fig. 3 and in Figs. 5 and 6. With the parts in this position, the suction block 76 places a paper 145 upon the receiving plates 104 and 105. The tongue 132 is moved horizontally by its cam through an opening 144 in the suction block to a position above a portion of the paper 145, see Fig. 6. The member 126 then moves downward carrying the tongue 132 through the opening 107 to the position shown in Fig. 7. The tongue, therefore, prevents the adherence of the paper to the suction block when the latter returns to the magazine.

The movement of the tongue 132 through the space 107 brings a portion of the paper in contact with the members 110 and causes the said members to move downwardly against the action of the leaf spring 114. In this position, the upper surface of the tongue 132 is below the projecting member 143. The reciprocating member 108 is now moved to the position shown in Fig. 8 and the projecting member 143 thereby folds the end 146 of the paper over the tongue 132. The tongue 132 is then withdrawn horizontally and the folded portion of the paper is held in contact with the lower surface of the projecting member 143 by the action of the leaf spring 114. Further motion of the reciprocating member 108 folds the ends 147 and 148 of the paper over the projecting member 143 and under the receiving plate 105 to a position as shown in Fig. 10. Thus, a single continuous motion of the reciprocating member 108 combined with the timed motion of the tongue 132 folds the paper into four layers and leaves a projecting end 149 unfolded. By properly choosing the sizes of the opening 107 and the location of the paper placed thereon, the size of the folds may be made as desired. If desirable, the paper may be folded without a projecting unfolded end.

Wrapping material supply

A standard 150 is mounted on the upper deck 21 and carries a reel 151 upon which is supported a roll of paper 152 used for wrapping the folded papers. A flexible strap 153 is fastened at one end of the standard 150, passes around the roll of paper 152 and carries at its other end a weight 154. This serves as a friction brake to prevent too rapid unwinding of the roll. A paste reservoir 155 contains a supply of paste 156. One end of the paste reservoir is closed by a paste roller 157 having raised and knurled portions 158. A second roller 159 is located beneath the roller 157. One end 160 of the paper from the roll is threaded beneath a roller 161 located under the paste reservoir and thence between the rollers 157 and 159 and thence between another pair of rollers 162 and 163.

Each of the knurled portions 158 on the roller 157 carries a film of paste to the paper. The said knurled portions may be located so that the paste is placed on the paper in strips at any desired position. Herein three strips of paste are used,—one in the center and one at each edge of the paper. The roller 162 carries raised portions 164 adapted to contact with the paper in the space between the strips of paste. The said roller is mounted in bearings 165 slidably carried on a portion of frame members 166. An adjustable spring 167 abuts against each of the bearings 165 and serves to maintain the roller 162 in yielding contact with the paper. The rollers 157 and 163 are connected by a train of gears 168 to rotate in opposite directions and with the same peripheral velocity.

The roller 157 is carried on a shaft 169 which also carries a pair of ratchet wheels 170 and 171 fixed thereto. Rotatably mounted on said shaft is a bell crank 172 carrying on one of its arms a spring pawl 173 adapted to contact with ratchet wheel 170. The opposite arm of the bell crank 172 is pivotally connected to the upper end of a vertical member 174 which carries at its lower end a yoke 175 adapted to straddle the shaft 31. A cam 176 is mounted on shaft 31 and rotated thereby and carries in its face an irregular channelway 177. A roller 178 is mounted on the member 174 and is guided within the said channelway. By this construction, rotation of shaft 31 causes vertical reciprocation of the member 174 and thereby causes rotation of the rollers 157 and 162 through a given distance for each cycle of the machine. The rotation of the said rollers causes the paper 160 to be drawn from the reel and the size of the ratchet teeth on ratchet 170 is selected to draw the proper quantity of paper for each cycle to wrap one of the folded papers.

Rotatably carried on the shaft 169 is a hand lever 179 carrying a spring pawl 180 adapted to engage the ratchet wheel 171. By means of this hand lever, the rollers may be manually rotated for threading in the paper or for adjustments.

Cut-off mechanism

Adjacent to the rollers 162 and 163 there is a member 181 slidable in vertical guideways 182 which form a part of frame members 166. The member 181 carries a knife blade 282 and a pair of wing members 183. The member 181 is actuated for raising and lowering by a stem 184 pivotally connected thereto. The said stem is raised and lowered by the lever 185 supported at its midpoint by a standard 186 and having a vertical member 187 pivotally connected to its opposite end. The range of movement of the member 181 is adjustable by means of nuts 188 on the stem 184 at its point of connection with lever 185. A cam 189 is carried on the shaft 32 and rotated thereby and carries in one face an irregular channelway 190. The member 187 carries at its lower end a yoke 191 adapted to straddle shaft 32. A roller 192 is also carried by said member 187 and is positioned within the channelway 190 and guided thereby. By this construction, the rotation of shaft 32 causes alternate raising and lowering of the member 181 and the knife blade 282 carried thereby and the timing of this motion is determined by the shape of the guideway 190.

In the operation of the cutoff mechanism, the knife blade is in the raised position when the rollers 157 and 162 are rotated to advance the strip of paper 160. The rotation of these rollers places the paper between the knife blade 182 and a cooperating member 193. Thereafter, the lowering of the knife blade cuts off the proper length to wrap one of the folded papers.

Sealing mechanism

A groove 194 in the upper deck member 21 carries a reciprocating member 195 having a longitudinal opening 196 through a portion of its length. At each side of the opening 196, there is an upraised portion 197 of the member 195 of the shape shown in Fig. 11. The member 195 is reciprocated by means of a cam 198 having an irregular guideway 200 engaging a roller 201 carried on a lever 202 which is pivotally mounted on a bearing 203 carried on the intermediate deck member 22. The upper end of the lever 202 is connected by a link 204 to a downwardly-extending portion 205 of the member 195.

A vertically-movable member 206 is guided in an opening in the upper deck 21 and projects within the opening 196 in the reciprocating member 195. The member 206 is operable for vertical movement by means of a cam 207 carried upon shaft 31 and having an irregular channelway 208. A roller 209 engages said channelway and is carried on one arm of the bell crank 210 pivotally mounted on a bearing 211 supported on the underside of the upper deck member 21. The opposite arm of the bell crank 210 is pivotally connected to the lower end of the member 206.

A reciprocating member 212 has one end positioned between the portions 197 of the member 195 and has an irregularly-shaped portion 213 extending to a point beneath the upper deck 21. The portion 213 terminates in a member 214 pivotally carried upon an arm 215 of lever 216. The said lever is pivotally mounted on the underside of the upper deck 21 and has a downwardly-extending portion 217 carrying a roller 218 engaging in an irregular channelway 219 in the periphery of a cam 220. The cam 220 is mounted on the shaft 31 and is rotatable thereby. By means of this construction, a reciprocating motion is imparted to the member 212 controlled by the shape of the channelway 219. A cover plate 221 covers a portion of the groove 194 in which the member 212 operates and maintains the said member therein.

Mounted on the upper deck 21 at one edge of the groove 194 is a guide member 222 carrying transverse members 223 in turn carrying a guide member 224. The guide member 222 is of greater depth than the guide member 224 so that a space is left between member 224 and the surface of the deck member 21. A reciprocating member 225 is guided between the guide members 222 and 224. One end of the reciprocating member 225 is pivotally connected to a lever 226 pivotally mounted in a bearing 227 carried on the intermediate deck member 22. The lever 226 carries a roller 228 engaging an irregular surface 229 carried on the cam 189. A spring 230 is attached at one end of the lever 226 and at the other end to the underside of the upper deck 21 and serves to maintain the roller 228 in contact with the irregular surface 229.

In the operation of the sealing apparatus, the rollers 157 and 162 are first rotated to deliver the proper length of wrapping paper in position for cutting. The knife blade is then lowered, cutting off the length of paper which is thereafter held in position on the reciprocating member 195 by the wing members 183. The reciprocating members 212 and 225, in this instant, are in the position illustrated in Fig. 11. The piece of wrapping paper is, therefore, pressed between these reciprocating members by the wing members 183 and the ends 232 and 233 of the paper are upwardly bent as illustrated in the said figure. The continued movement of the reciprocating member 108 after the folding of the papers, brings the member 113 into contact with the member 195 stopping the travel of members 110. Since members 110 are reciprocable in their grooves 108a the member 108 is not stopped by the stopping of members 110. Further movement of member 108 positions the folded paper between the wing members 183 and above and in contact with the wrapping paper 231. In the motion of the reciprocating member 108, the folded paper is prevented from slipping by the action of leaf spring 114 against the members 110 which holds the paper in contact with the projecting member 143 until the travel of members 110 is stopped.

After the folded paper has been placed in position for sealing, the knife blade and wing members are raised and the reciprocating members 212 and 225 are successively operated to fold the ends 232 and 233 of the wrapping paper over the folded paper. The reciprocating member 225 is divided at the operating end into two portions 234 (see Fig. 13) and the operating end of member 212 is positioned to pass therebetween. The said members have sufficient flexibility to exert a downward pressure on the papers to cause the paste to adhere strongly thereto.

Carried on the receiving plate 105 is a leaf spring 235 having a downwardly-inclined serrated end 236. During the folding of the wrapping paper, the member 206 is raised to bring a portion of the unfolded end 149 of the folded paper in contact with the said serrated edge. The reciprocating member 108 is then retracted and the folded and sealed paper is prevented from returning therewith by its contact with the said serrated edge. After the retraction of the said member 108, member 206 is lowered to break the said contact.

After the retraction of the member 108, the reciprocating member 195 is actuated to bring the portions 197 thereof into contact with the folded and sealed paper and to remove the same from the sealing position. During this motion, a projecting portion 237 of the lever 202 comes in contact with a portion of the lever 226 and causes the simultaneous retraction of the member 225. This movement is followed by the return of all of the reciprocating parts to the initial position shown in Fig. 11.

A latch member 238 is mounted on one of the guide members 182. By means of screws 239 and slotted holes 240, the latch member is free for vertical movement of limited distance. A small spring 241 normally maintains the lower end of the latch member in contact with the surface of reciprocating member 195. The lower end of the member 238 projects through the opening between the portions 234 of the member 225 and is so shaped that a folded paper may be passed thereunder in one direction but will be prevented from returning with the return motion of the reciprocating member 195.

The motion of the member 195 in removing a folded and sealed paper from the sealing station carries the said paper beneath the member 225 to a point beyond the latch 238. Successive papers thus removed force the preceding papers ahead of them until they are successively discharged into a container 242 carried on the edge of the upper deck member 21. The unfolded projecting ends 149 of the papers pass between the guide member 224 and the upper deck surface. A second spring latch arrangement 243 carried in a cavity in reciprocating member 195 also prevents return of papers with said member after they have passed the first latch 238.

The invention claimed is:

1. In a folding machine the combination of a yielding member, a movable tongue adapted to bring a portion of an article to be folded into contact with said yielding member, a reciprocable folding member adapted to fold a second portion of the article about said tongue, and means for withdrawing said tongue from between the folds of the article whereby the folded article will be yieldingly held between said yielding member and said folding member for further movement.

2. In a folding machine the combination of a pair of spaced apart receiving plates, a reciprocable folding member adjacent thereto, a movable tongue adapted to force a portion of an article to be folded between said receiving plates to a point beyond the line of travel of the folding member, means for moving the folding member to fold the article about the tongue, means for retracting the tongue from between the folds of the article, and means for continuing the travel of the folding member whereby the article is folded about the end thereof by contact with one of said receiving plates.

3. In a folding machine, the combination of a reciprocating folding member adapted to engage an article for folding the same, a yielding member for yieldingly maintaining the article in contact with said folding member during a part of its travel, and means for releasing said yielding means from contact-making position at another point in the travel of said reciprocating member.

4. In a folding machine the combination of a reciprocating member adapted to engage, fold and transport an article during its forward stroke, and a spring member adapted to yieldingly engage the article at the end of the forward stroke of said reciprocating member to prevent the article from being transported by the reciprocating member on its return stroke.

5. In a folding machine the combination of a magazine, a suction block for removing an article to be folded from said magazine, said block being adapted to engage said article at two points having a non-engaged space therebetween, a pair of spaced apart receiving plates, mechanism for moving said suction block to place said article in contact with said receiving plates with the non-engaged portion thereof adjacent the space between said plates, a movable tongue, mechanism movable in timed relation with said first-mentioned mechanism for moving said tongue to engage the previously non-engaged portion of said article for initiating the folding of the article by moving the said portion through the space between said receiving plates and for breaking the engagement of said suction block with said article, and other mechanism for folding said article when so moved.

6. In a folding machine the combination of a magazine, a suction block for removing an article to be folded from said magazine, said block being adapted to engage said article leaving a portion thereof non-engaged, a pair of spaced apart receiving plates, mechanism for moving said suction block to place said article in contact with said receiving plates with the non-engaged portion thereof adjacent the space between said plates, a movable tongue, mechanism movable in timed relation with said first mentioned mechanism for moving said tongue to engage the previously non-engaged portion of said article for initiating the folding of the article by moving the said portion through the space between said receiving plates and for breaking the engagement of said suction block with said article, and other mechanism for folding said article when so moved.

7. In a folding machine the combination of a pair of spaced apart receiving plates, a horizontally reciprocable member movable beneath said plates, a slidable member carried by said reciprocable member, adapted for limited sliding movement upon said reciprocable member in a direction parallel to the direction of movement of said reciprocable member and adapted for limited vertical movement with respect to said reciprocable member, a spring for normally maintaining said slidable member at the upper limit of its vertical movement, a stop for engaging said slidable member at one end of the reciprocating movement of said reciprocable member, said stop being so placed as to bring a portion of said slidable member beneath the space between said receiving plates, a movable tongue, means for moving said tongue to force a portion of an article to be folded through said space and into engagement with said slidable member and for depressing said slidable member against the action of said spring, a folding member fixedly carried by said reciprocable member, mechanism for moving said reciprocable member to cause said folding member to engage said article and fold one end thereof about said tongue, and means for withdrawing said tongue from between the folds of said article whereby said article is grasped between said slidable member and said folding member by the action of said spring for further manipulation.

8. In a folding machine the combination of a pair spaced apart receiving plates, a horizontally reciprocable member movable beneath said plates, a slidable member carried by said reciprocable member, adapted for limited sliding movement upon said reciprocable member in a direction parallel to the direction of movement of said reciprocable member and adapted for limited vertical movement with respect to said reciprocable member, a spring for normally maintaining said slidable member at the upper limit of its vertical movement, a stop for engaging said slidable member at one end of the reciprocating movement of said reciprocable member, said stop being so placed as to bring a portion of said slidable member beneath the space between said receiving plates, a movable tongue, means for moving said tongue to force a portion of an article to be folded through said space and into engagement with said slidable member and for depressing said slidable member against the action of said spring, a folding member fixedly carried by said reciprocable member, mechanism for moving said reciprocable member to cause said folding member to engage said article and fold one end thereof about said tongue, means for withdrawing said tongue from between the folds of said article whereby said article is grasped between said slidable member and said folding member by the action of said spring, and means for continuing the movement of said reciprocable member to carry said article beneath one of said receiving plates, whereby said article is folded about said folding member.

9. In a folding machine the combination of a reciprocable member, a folding member carried thereby a slidable member carried by said reciprocable member, adapted for limited sliding movement upon said reciprocable member in a direction parallel to the direction of movement of said reciprocable member and adapted for limited vertical movement with respect to said reciprocable member, a spring for normally maintaining said slidable member at the uper limit of its vertical movement, means for placing a portion of an article to be folded in position between said slidable member and said folding member to be held in such position by the pressure of said spring, a stationary plate, means for moving said reciprocable member to bring said article into engagement with said plate for folding said article about said folding member and to transport said folded article to a delivery point, and a stop adapted to engage said slidable member in the travel of said reciprocable member for sliding the slidable member out of engagement with said article when the said delivery point is reached.

10. In a folding machine the combination of a reciprocable member, a folding member carried thereby, a slidable member carried by said reciprocable member, adapted for limited sliding movement upon said reciprocable member in a direction parallel to the direction of movement of said receptacle member and adapted for limited vertical movement with respect to said reciprocable member, a spring for normally maintaining said slidable member at the upper limit of its vertical movement, means for placing a portion of an article to be folded in position between said slidable member and said folding member to be held in such position by the pressure of said spring, a stationary plate, means for moving said reciprocable member to bring said article into engagement with said plate for folding said article about said folding member and to transport said folded article to a delivery point, a stop adapted to engage said slidable member in the travel of said reciprocable member for sliding the slidable member out of engagement with said article when the said delivery point is reached, and an article engaging member for retaining said article at said delivery point during the reverse stroke of said reciprocable member.

In witness whereof, I have hereunto affixed my signature.

GEORGE J. EGENOLF.